April 6, 1937.    J. WOOLER    2,076,438
VARIABLE SPEED GEARING
Filed Jan. 14, 1936    2 Sheets-Sheet 1
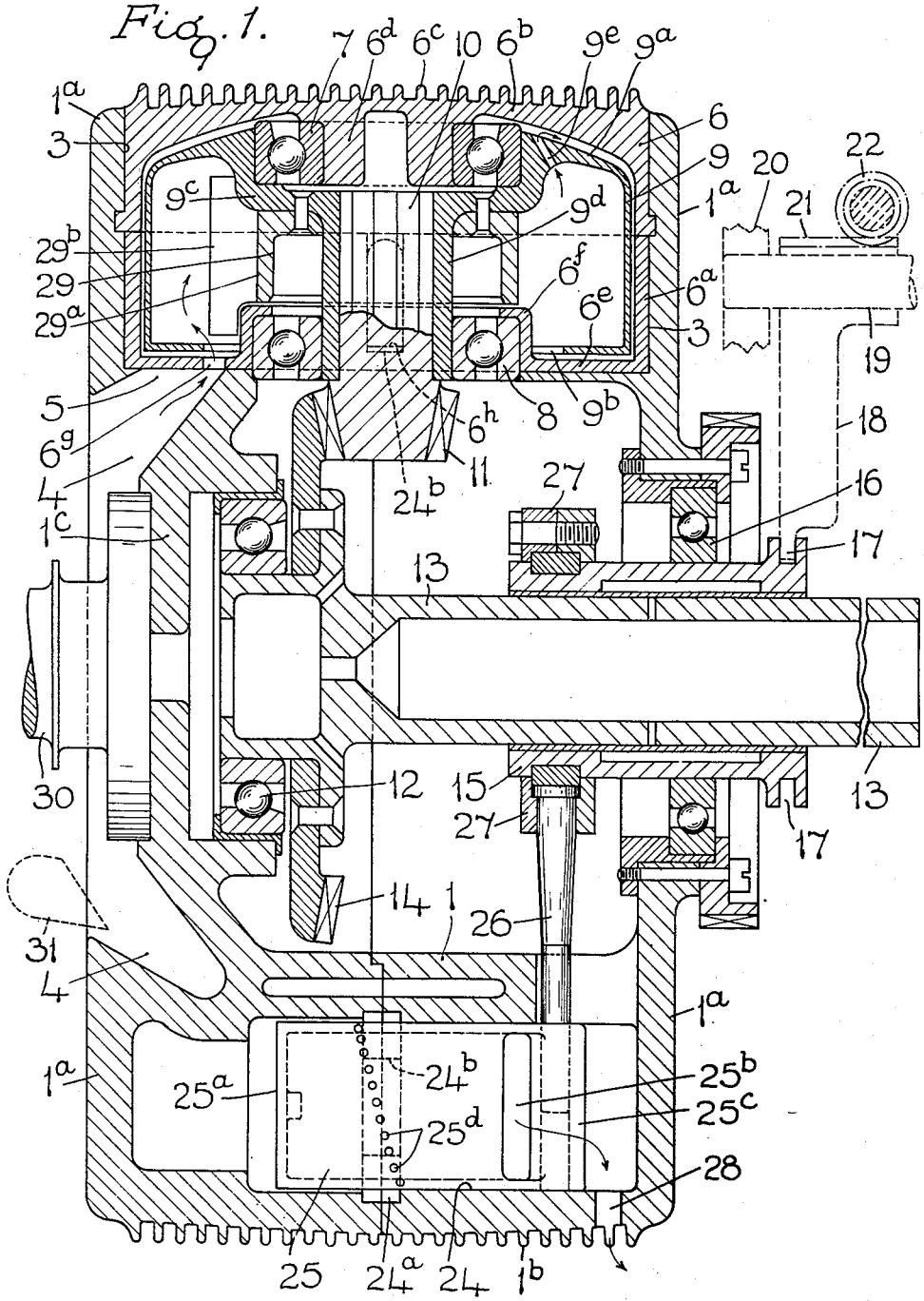
INVENTOR
JOHN WOOLER
BY Norris & Bateman
ATTORNEYS April 6, 1937.  J. WOOLER  2,076,438
VARIABLE SPEED GEARING
Filed Jan. 14, 1936   2 Sheets-Sheet 2

INVENTOR
JOHN WOOLER
By Norris & Bateman
ATTORNEYS

Patented Apr. 6, 1937

2,076,438

UNITED STATES PATENT OFFICE 2,076,438

VARIABLE SPEED GEARING

John Wooler, Ruislip, England

Application January 14, 1936, Serial No. 59,132
In Great Britain January 15, 1935

13 Claims. (Cl. 74—259)

This invention relates to variable speed gearing, and has for its object to construct improved mechanism constituting a more efficient gear.

According to this invention, a casing acting as a flywheel revolvable by a prime mover has a number of hollow rotors freely mounted and radially positioned within the casing and have a gyroscopic coupling action imparted to them in a plane at right angles to the axis of the drive, the hollow rotors through gearing giving power to drive a transmission shaft connected with the ordinary and other gear or main drive shaft for moving a motor vehicle or driving machinery.

Means are provided whereby fluid is fed to the hollow rotors to increase the weight of the rotors, and release valves are provided operable manually through suitable mechanism whereby the fluid within the rotor can be released to lessen the weight of the rotors, so that variations of drive due to the weight of the rotors is effected.

My invention will be more clearly understood from the following description aided by the example of construction shown on the annexed drawings in which:—

Figure 1 is a side sectional view and,

Figure 2 a front view partly in section of the revolvable casing or flywheel and its gearing appliances.

Figure 3 is a side view showing the revolvable casing or flywheel within a fixed casing shown broken, and such fixed casing may be connected to the engine or driving unit or be separate.

According to drawings the revolvable casing or flywheel is formed in two halves 1$^a$, 1$^a$ secured together by bolts 2, and in this casing are formed three cylindrical holes 3, radially arranged and spaced at equi-distance apart and leading from the periphery of the casing 1 for a short distance towards the centre.

The periphery of the revolvable casing 1 may be provided with circumferential ribs 1$^b$, and one face is formed with a circular angled recess 4 having ports 5 leading to each of the cylindrical holes 3.

Secured in each of the cylindrical holes 3 are liners, each being formed in two sections 6, 6$^a$, the outer section being formed with a closed end 6$^b$ which conforms with the shape of the periphery of the casing 1 and ribs 6$^c$ are provided corresponding with the ribs 1$^b$ of the casing 1. The closed end is formed with a centrally disposed boss 6$^d$ extending inwardly, and on which is mounted a ball bearing 7. The other or inner section 6$^a$ of the liner is formed with a closure 6$^e$ having a central cup shaped boss 6$^f$, in which is positioned a further ball bearing 8, and the closed end 6$^e$ is provided with a slot forming a port 6$^g$ communicating with the ports 5 in the angled recess 4. The inner section 6$^a$ of each liner is provided with two slots 6$^h$ positioned in the side walls and opposite each other. Positioned within each of the cylindrical liners 6, 6$^a$ are hollow rotors 9 which are formed cup shape, the outer end 9$^a$ being closed and the inner end having turned in portions leaving a central open portion 9$^b$. The closed end 9$^a$ is formed with a recessed boss 9$^c$ which can be positioned on the ball bearing 7 and forms the bearing for the outer end of the rotor 9. The boss 9$^c$ is provided with a depending hollow stem 9$^d$, which is carried at its free end by the ball bearing 8 and forms a bearing for the inner end of the rotor, so that the rotors are freely revolvable within the cylindrical liners.

Secured within the hollow stems 9$^d$ of each of the rotors 9, is a stem 10, the inner end of which carries or is formed as a bevel pinion 11.

Holes or ports 9$^e$ are formed in the closed end of each rotor so that fluid contained therein can be passed to the outside of the rotor and to the slots or ports 6$^h$, in the inner section 6$^a$ of the liners.

The face of the revolvable casing 1 having the angled recess 4 is provided with a central boss portion 1$^c$ in which is positioned a ball bearing 12 forming a bearing for one end of a driven shaft 13 positioned within the casing, and this shaft 13 carries a bevel wheel 14 which meshes with each of the bevel pinions 11 of the rotors 9.

Surrounding the driven shaft 13 is a sleeve 15 revolvably and slidably mounted thereon, and this sleeve 15 is carried by a bearing 16 positioned in the face of the revolvable casing 1, and such sleeve 15 at outside the casing is provided with a ring recess 17 which is engaged by a forked end of an operating arm 18 mounted on a spindle 19 secured to an outer fixed casing 20, and this arm is provided with a toothed rack 21 engageable by a toothed pinion 22, which is operable by a lever 23 to impart the sliding movement to the sleeve 15. The revolvable casing 1 is provided with three cylindrical holes 24 positioned radially around same and centrally between each of the holes 3, and each hole 24 is formed with a ring recess 24$^a$ of greater diameter at one part, such recesses 24$^a$ communicating with passageways 24$^b$ formed around the casing 1 and leading to the cylindrical holes 3 and communicating with the slots or ports 6$^h$ in the walls of the inner sections 6$^a$ of the cylindrical liners. Positioned within each of the cylindrical holes 24 is a fluid control valve 25 which is formed somewhat bucket shape with one end 25ª closed, and the other end 25ᵇ open, and this open end 25ᵇ is provided with a holed boss 25ᶜ, in which is positioned one arm 26 of a three armed spider 27, the inner part of which is mounted on the slidable sleeve 15, so that when the sleeve is moved on the shaft 13, a sliding movement is also imparted to the control valves 25. Each control valve 25 is formed with a ring of holes 25ᵈ positioned at an angle, and so arranged with regard to the ring recess 24ª that the amount of fluid passing to the interior of the valve 25 is regulated by the movement of the valve to vary the number of holes 25ᵈ exposed to the recess 24ª.

Three holes 28 are formed in the periphery of the revolvable casing 1, each leading to one of the cylindrical holes 24 containing the control valves, so that fluid passing from the open end 25ᵇ of the control valve 25 may pass via these holes 28 to outside the casing 1. Attached to the inside of each rotor is an impeller 29 formed from a central boss 29ª which is riveted or otherwise secured to the boss 9ᶜ, and this central boss 29ª carries three or more radially arranged blades 29ᵇ.

The revolvable casing or flywheel is positioned within a fixed casing 20 and is revolvable in bearings of the fixed casing, the boss 1ᶜ on the face of the revolvable casing being connected in any suitable manner with a prime mover 30, and any suitable means may be provided whereby fluid is passed from a reservoir to be fed through a pipe 31 into the angled recess 4 in the face of the casing 1, and after passing through the gear can be returned to the reservoir to ensure a constant supply at the reservoir.

In action the prime mover 30 rotates the revolvable casing or flywheel 1 positioned in the fixed casing 20, and in revolving the flywheel imparts a gyroscopic coupling action to the rotors 9, whereby they are revolved in a plane at right angles to the axis of the drive, and through the bevel pinions 11 on the stem 10 of the rotors 9 meshing with the bevel wheel 14 secured to the driven shaft 13 causes this shaft 13 to be revolved.

To vary the degree of drive between the driving and driven shafts, fluid is fed from the reservoir via the pipe 3 to the angled recess 4 and through the ports 5, ports 6ᵍ in the liners and through the central open portion 9ᵇ to inside the rotors 9 which are gradually filled and the fluid contained therein increases the weight of the rotors, which has a retarding effect on the rotors 9, and owing to the varying gyroscopic coupling set up and increases the driving effect between the revolving casing or flywheel 1 and the rotors 9.

When it is required to vary the driving effort between the revolving casing 1 and the rotors 9 due to increase of load on the driven shaft 13, the control valves 25 are actuated by moving the sleeve 15 to allow fluid to escape from the revolving casing 1, the fluid first passing through the holes 9ᵉ in the top of the rotors to outside the rotors through the slots or ports 6ʰ and passageways 24ᵇ to the ring recesses 24ª through the holes 25ᵈ in the valves 25 exposed to the recesses 24ª and via the open ends 25ᵇ of the valves to the holes 28 to outside the revolvable casing 1, when the lightening of the rotors due to this escape of fluid will decrease the driving effort between the revolvable casing and the rotors, the setting of these control valves 25 controlling the amount or level of fluid in the rotors 9 by determining the quantity of fluid allowed to pass to outside the casing 1. The blades 29ᵇ of the impellers 29 attached to the inside of the rotors 9, will when revolving act on the fluid contained in the rotors to impart a further retarding action to the rotors 9, whereby a greater efficiency of drive between the revolvable casing 1 and rotors 9 is obtained.

What I do claim as my invention and desire to secure by Letters Patent is:—

1. Variable speed gearing, comprising a rotatable casing acting as a flywheel revolvable by a prime mover within a fixed casing, a number of hollow rotors substantially radially positioned within the revolvable casing and mounted for rotation, said rotors being adapted to have fluid fed thereto and operable to exert a gyroscopic coupling action with the rotatable casing, a driven shaft having a gear provided thereon, a gear on each of said hollow rotors meshing with the gear on said driven shaft, fluid inlet ports connecting the outside of said rotatable casing with the interior of the hollow rotors, fluid outlet ports leading from inside the hollow rotors to passages which communicate with the exterior of said rotatable casing, and to a valve for controlling the flow of fluid through said passages, means for actuating said valves to determine the amount of fluid to be retained within said hollow rotors, to thereby lessen or increase their weight, said means being manually operable from outside the fixed casing, and means for feeding fluid to said inlet ports from the exterior of said rotatable casing.

2. Variable speed gearing comprising a rotatable casing acting as a fly wheel and connected to a shaft revolvable by a prime mover and positioned within a fixed casing, a plurality of hollow rotors, capable of being fluid fed, freely mounted in bearings and substantially radially disposed within said rotatable casing, each of said rotors having a stem projecting inwards and carrying a bevel toothed pinion meshing with a bevel toothed wheel mounted on a driven shaft freely mounted in bearings and within the revolvable casing, said shaft projecting outside the revolvable casing and adapted to be connected to the mechanism to be driven, said rotatable casing having an angled recess to which fluid may be fed, and fluid inlet ports communicating with said recess and leading to the interior of said hollow rotors, outlet ports in said hollow rotors leading to outside the rotors, passageways connecting the outlet ports of each rotor and communicating with the exterior of said rotatable casing, a valve in said passages between adjacent pairs of rotors, for controlling the flow of fluid from said rotors, means carried by the transmission shaft and manually actuable from outside said fixed casing for actuating said valves to determine the flow of fluid from said rotors, to thereby vary the driving effort between said rotatable casing and said rotors by determining the quantity of fluid contained within the rotors.

3. The variable speed gearing described in claim 1, wherein said valves are of generally cylindrical form and are provided with a plurality of fluid apertures disposed at an angle whereby when said valves are rocked they will place one or more of said apertures in fluid communication with said passages, and wherein said valves are connected to and simultaneously acted upon by arms connected to a control means mounted on said driven shaft, for manually operating the valves to determine the positions of said apertures with respect to said passageways.

4. In a variable speed gearing mechanism, a driving member adapted to be connected to a prime mover, a driven member adapted to be connected to a load, a gyroscopic element mounted for rotation on said driving member and having a gear meshing with a gear carried by said driven shaft, said element and said gears being operable to transmit power between said driving and driven members with a value of torque proportional to the mass of said element, and control means for selectively varying the mass of said element, to thereby vary the magnitude of the torque transmitted between said members.

5. The variable speed gearing mechanism described in claim 4, wherein said gyroscopic element is hollow and is adapted to contain a liquid, and wherein said control means is operable to selectively vary the mass of fluid retained in said elements.

6. In a variable speed gearing, a flywheel-like driving member adapted to be connected to a prime mover, means mounting said member for rotation about a fixed axis, at least one gyroscopically operable rotor mounted on said member for rotation about an axis which is substantially normal to said axis of said member, a gear provided on said rotor, a driven shaft aligned with said driving member and mounted for rotation with respect thereto, means providing a power transmitting connection between said rotor and said driven shaft, said rotor having a perforated bottom facing away from the axis of said member and an open top facing toward said axis, means for feeding fluid into the open top of said rotor, and control means for varying the quantity of fluid retained in said rotor, to thereby vary the mass of said rotor and vary the magnitude of the torque transmitted between said driving member and said driven shaft.

7. The variable speed gearing described in claim 6, wherein said member is hollow and defines an inwardly facing pocket in which said rotor is mounted, and wherein said control means comprises a valve for controlling the rate of fluid flow away from said pocket.

8. The variable speed gearing described in claim 6, wherein said means for feeding fluid into the open top of said rotor comprises an open-sided inwardly facing annular groove provided in said member, and communicating with said rotor, together with means for maintaining said groove filled with fluid.

9. The variable speed gearing described in claim 6, wherein the interior of said rotor is provided with a plurality of blades for compelling substantially synchronous rotation of said fluid and said rotor.

10. In a variable speed gearing, in subcombination, a flywheel-like member mounted for rotation about a fixed axis and having fluid passages disposed substantially normal to said axis adapted to receive fluid from a gyroscopically operable power transmitting mechanism, a hollow valve member mounted for sliding axial movement in a recess in said member intersecting said passages, a plurality of apertures provided in said valve member and communicating with an outlet, and means for selectively shifting said valve member axially to thereby vary the number of said apertures communicating with said outlet, to control the flow of fluid from said passages.

11. In a variable speed gearing mechanism, a flywheel-like member mounted for rotation and split into two sections along a plane substantially normal to the axis of rotation of said member, said sections being provided with arcuately shaped recesses facing each other and providing an abutment wall which faces toward the axis of rotation, and a generally cylindrical gyroscopic power transmitting unit disposed substantially radially and clamped in said recesses, and having an outwardly facing wall which engages said abutment wall and restrains said unit against outward displacement in response to centrifugal force.

12. The variable speed gearing mechanism described in claim 11, wherein said unit comprises a casing split into two sections along a plane normal to the axis of said unit, each of which carries a bearing in which a hollow gyroscopically operable power transmitting element is rotatably supported.

13. In a variable speed gear mechanism, a driving member mounted for rotation about a fixed axis, said member providing an open sided recess facing toward the axis of rotation, a driven member mounted for rotation relatively to said driving member, at least one gyroscopically operable rotor mounted for rotation in said recess and having a perforated bottom facing the bottom of said recess, means providing a driving connection between said rotor and said driven member, means for supplying liquid to said rotor, and means for selectively varying the quantity of liquid retained in said recess, for thereby varying the quantity of liquid retained in said rotor.

JOHN WOOLER.